(12) United States Patent
Oldfield

(10) Patent No.: US 6,827,914 B2
(45) Date of Patent: Dec. 7, 2004

(54) METHOD, APPARATUS AND USE OF CHELATING AGENTS FOR THE PURIFICATION OF CALCIUM SULPHATE

(76) Inventor: Christopher Oldfield, 82 Gateside Ave., Eaddington, East Lothian (GB), EH41 4PX ( * ) Notice: Subject to any disclaimer, the term of this patent is extended or adjusted under 35 U.S.C. 154(b) by 0 days.

(21) Appl. No.: 10/037,348

(22) Filed: Oct. 29, 2001

(65) Prior Publication Data

US 2002/0192145 A1 Dec. 19, 2002

Related U.S. Application Data

(63) Continuation of application No. PCT/GB00/01487, filed on Apr. 28, 2000.

(51) Int. Cl.⁷ ................................................ C01F 11/46
(52) U.S. Cl. ........................ 423/170; 423/158; 423/166; 423/555
(58) Field of Search ................................ 423/158, 159, 423/160, 161, 555, 166, 170; 210/702, 704, 712, 723, 724–727

(56) References Cited

U.S. PATENT DOCUMENTS 3,308,065 A * 3/1967 Lesinski ...................... 134/42
3,642,456 A    2/1972 Brent, Jr. et al. ............. 23/304
5,151,196 A * 9/1992 Paul et al. ................... 210/712
5,234,602 A * 8/1993 Morris et al. ................ 210/698
5,733,070 A    3/1998 Angell ........................ 405/263

FOREIGN PATENT DOCUMENTS

| | | |
|---|---|---|
| FR | 2 510 140 | 1/1983 |
| GB | 2 173 781 A | 10/1986 |
| JP | 1316479 | 12/1989 |

* cited by examiner

*Primary Examiner*—Stuart L. Hendrickson
*Assistant Examiner*—Peter J Lish
(74) *Attorney, Agent, or Firm*—Heslin Rothenberg Farley & Mesiti P.C.

(57) ABSTRACT

A chemical process for the purification of $CaSO_4$ utilizes the ability of an aqueous solution of a chelating agent to selectively dissolve $CaSO_4$ in that the initial extraction can be carried out at certain pH and $CaSO_4$ can be recovered by titration to a different pH (usually a a lower pH) following a mechanical treatment, such as centrifugation or filtration, to separate the aqueous chelate solution from insoluble material. Also claimed are an apparatus and the use of chelating agents therefor.

10 Claims, No Drawings

METHOD, APPARATUS AND USE OF CHELATING AGENTS FOR THE PURIFICATION OF CALCIUM SULPHATE

CROSS REFERENCE TO RELATED APPLICATIONS

This application is a continuation of PCT application PCT/GB00/01487 filed Apr. 28, 2000, and published in English as WO 00/66495 on Nov. 9, 2000. PCT/GB00/01487 claimed the priority of British application 9909749.5, filed Apr. 29, 1999. The entire disclosures of both are incorporated herein by reference.

TECHNICAL FIELD

The invention to be described hereinafter relates to processing of materials to obtain a purified product. In particular, there is described a novel method for the recovery of nearly pure calcium sulphate from a naturally occurring material such as the mineral gypsum, or from calcium sulphate-containing materials arising from an industrial process or technological exploitation of materials. Thus the invention provides for production of purified material from raw mineral sources or as part of a recycling process.

BACKGROUND TO THE INVENTION

The chemical compound calcium sulphate, referred to hence as $CaSO_4$, occurs in nature as the mineral gypsum. $CaSO_4$ is a commodity product with a market-size that runs into several million tonnes per annum, worldwide. $CaSO_4$ finds a wide range of applications in the construction, ceramics and pharmaceutical industries.

Most of the world's supply of $CaSO_4$ is obtained by open-cast mining of gypsum deposits. Gypsum is mined in nearly every country in the world, especially in the UK, France, Spain and the USA. The mining process is conventional: the ore is extracted by blasting (controlled explosion), followed by physical separation of high-grade gypsum (>98% by weight $CaSO_4$) from lower-grade material. Typically, half of the material (by weight) recovered from a blast will be high-grade gypsum. The remaining lower-grade material, which still might contain up to 90% by weight $CaSO_4$, is not further processed and common practice is to back-fill it on-site.

$CaSO_4$ is also a by-product of the flue-gas desulphurisation process operated in modern fossil-fuel driven power-stations. In this process sulphur-oxyacids present in flue gases are removed by chemical reaction with a calcium oxide filter. The product is a low-grade $CaSO_4$ that is contaminated with other materials derived from flue gases, including elemental sulphur.

Economic and environmental concerns are driving research into methods of converting low-grade $CaSO_4$ into high-grade, or pure, $CaSO_4$ and for its extraction from products of anthropomorphic origin as part of the recycling process.

Hitherto, conventional approaches have not revealed an economic solution to realise the desired conversion.

The standard chemists' approach to purification is to identify a solvent which preferentially dissolves the target compound, thus permitting the insoluble contaminants to be removed using an appropriate physical process such as filtration or centrifugation. The first step in identifying a suitable solvent is to understand the chemical nature of the target compound.

$CaSO_4$ is an ionic compound, or salt, which is nevertheless insoluble in water because the energy released by the hydration of the component calcium ($Ca^{2+}$) and sulphate ($SO_4^{2-}$) ions, that is by the creation of water-ion bonds, is less than the energy required to neutralise the ion-ion bonds within the solid and hence allow solid→solution phase transfer. Thus the natural order is to confer stability on the solid salt in preference to a solution of respective ions and one readily observes that the solid substance retains its integrity in contact with water. Therefore, this discouraging observation has left the purification of materials containing $CaSO_4$ as something of a challenge to those of ordinary skill in the art.

This unique stability of $CaSO_4$ in water contrasts with that for soluble salts such as sodium chloride (NaCl), where the energy released in the formation of water-ion bonds exceeds that of the ion-ion bonds in the crystal lattice, hence the crystal lattice breaks down and the ions dissolve. Nevertheless, calcium and sulphate ions are intrinsically soluble in water, as can be seen by comparison with other salts. Thus, for example, sodium sulphate ($Na_2SO_4$) and calcium chloride ($CaCl_2$) are both highly water-soluble salts.

$CaSO_4$ will, however, dissolve in aqueous solutions containing a calcium chelating agent. Chelating agents are a class of compounds which form very strong bonds with divalent metal ions ($M^{2+}$), such $Ca^{2+}$, much stronger than those formed between the metal-ion and water. The chemical properties of chelating agents are well-described in the scientific literature. A number of different chelating agents, with differing specifities for the particular metal ion they chelate, are available commercially. They find numerous applications in chemistry and biology as means of keeping otherwise insoluble salts of divalent metal-ions in solution.

The compound ethane 1,2-diamine N,N,N'N' tetra-acetic acid (EDTA) is one example of a calcium chelating agent which is commercially available. In aqueous solution, at neutral or alkaline pH, EDTA reacts with the calcium ion to form the highly water-soluble calcium-EDTA complex, $CaEDTA^-$. For example, at 20° C. and pH 10 the reaction can be written as:

$$Ca^{2+} + EDTA^{3-} \leftrightarrow CaEDTA^- \quad \text{(Equation 1)}$$

The equilibrium constant for the reaction is defined as, $$K = \frac{[CaEDTA^-]}{[Ca^{2+}][EDTA^{3-}]}$$

At 20° C. and pH 10, for example, $K=10^{10} dm^3 mol^{-1}$; that is the binding of $Ca^{2+}$ to EDTA is essentially irreversible.

When calcium sulphate is mixed with an aqueous solution of EDTA at neutral or alkaline pH, therefore, the $CaEDTA^-$ complex-ion dissolves and the sulphate ion follows it into solution as an independent entity. This is a spontaneous process and the resulting solution is thermodynamically stable and optically transparent. However, EDTA is unable to chelate calcium ions at low pH (i.e. below pH4). Therefore when this solution is acidified the $CaEDTA^-$ complex-ion breaks down, $Ca^{2+}$ and $SO_4^{2-}$, recombine and $CaSO_4$ precipitates.

SUMMARY OF THE INVENTION

The invention to be more particularly described hereinafter, provides the basis for a chemical technology which allows $CaSO_4$ to be separated from other materials. This invention provides a chemical process for the purification of $CaSO_4$ that utilises the ability of an aqueous solution of a chelating agent to selectively dissolve $CaSO_4$.

The ideal chelating agent is one which is soluble in water over a wide range of pH, but which chelates calcium only over a relatively narrow pH range. Thus according to the invention the initial extraction can be carried out at certain pH and $CaSO_4$ can be recovered by titration to a different pH (usually a lower pH) following a mechanical treatment, such as centrifugation or filtration, to separate the aqueous chelate solution from insoluble material.

The aqueous solution of the chelating agent can be recycled for another round of $CaSO_4$ extraction following titration back to the original pH.

Thus according to the present invention there is provided a method for the recovery of calcium sulphate from a crude or contaminated calcium sulphate source, in essentially pure form, by the method of dissolving the material in an aqueous solution of a calcium-chelating agent at a pH at which chelation occurs (the extraction step), followed by removal of insoluble residuum by a suitable physical technique such as, but not limited to, centrifugation or filtration (the separation step), followed by recovery of the calcium sulphate by acidification to a pH at which calcium sulphate, but not the chelating agent, precipitates (the recovery step).

The invention may be applied whatever the origin of the crude or contaminated material. Thus the invention is suitable for use on naturally occurring materials or those arising from the intervention of technology, including but not limited to, mineral deposits such as gypsum, and gypsum containing formations such as limestone, dolomitic limestones, shales and cap rock (an anhydrite-gypsum deposit found in Texas and Louisiana), to by-products of industrial processes such as the flue-gas desulphurisation process, contaminated wastes such as phospho-gypsum (a uranium contaminated material), construction industry debris, waste cladding materials and demolition rubble, and to calcium sulphate-containing commodity materials as part of the recycling process.

A wide variety of calcium chelating agents can be applied with varying levels of efficiency including, but not limited to ethane 1,2-diamine N,N,N'N' tetra-acetic acid (EDTA) or 2-{(carboxymethyl) [2-trimethylamino)ethyl]amino}acetic acid, and sodium salts of such agents as well as the free acids are considered to equally effective in view of the ready mobility of the sodium ion in dissociating in aqueous solution.

A suitable chelating agent is a soluble polydentate, e.g. at least tridentate ligand, which may be an organic chelating compound modified by addition of or substitution with a solubilising group, e.g. a quaternary ammonium group, which is soluble in acid pH ranges, especially remaining soluble below pH 4.

Chelating groups include, but are not limited to, sulphonic and carboxylic groups, and the latter are preferred for purification of calcium sulphate.

Preferred chelating agents include the following: 4-(carboxymethyl)-2-(trimethylamino)pentane-1,5-dicarboxylic acid, 2-(carboxymethyl)-2-(trimethylamino) butane-1,4,dicarboxylic acid, 2-(carboxymethyl)-3-(trimethylamino)butane-1,4-dicarboxylic acid, and the like.

In the method of the invention, preferably the solution is made acidic, for the purpose of recovery of the calcium sulphate, by the addition of any acidic substance including, but not limited to, sulphuric acid.

Preferably the acidic solution of the chelating agent obtained following recovery of the calcium sulphate is made neutral or alkaline once again by the addition of any basic substance including, but not limited to, sodium hydroxide or preferably calcium hydroxide.

Preferably the aqueous solution of the chelating agent is recycled from a previous extraction, following titration to neutral or alkaline pH by the method.

The extraction, separation and recovery stages may be carried out at any temperature considered appropriate by those skilled in the art.

The invention further provides an apparatus for the purification of calcium sulphate by these methods of the invention, and comprising a vessel for receiving crude or contaminated material containing calcium sulphate to be purified, at least one calcium chelating reagent and an aqueous medium, whereby said material and said reagent are intimately admixed in said aqueous medium to form an extraction liquor, means for separating insoluble materials from said extraction liquor, means for adjusting the pH of the extraction liquor by supply of acidic or basic media into said vessel, and means for recovery of purified calcium sulphate.

The apparatus may comprise a plurality of reaction vessels each dedicated to a particular stage of the process, e.g. an extraction vessel, a separation vessel, a recovery vessel, and each may be associated with and operatively connected to separate reagent supply vessels. The extraction vessel may be equipped with agitation means or may be adapted to achieve mixing in other ways e.g. static mixers are known in the chemical industry whereby reagent supply lines and internal baffles and conduits are provided according to a design predetermined to promote intermingling and mixing of reagent fluids.

The separation vessel may be adapted to operate under centrifugal separation principles as a matter of preference but also may be adapted to decant extraction liquor from insoluble materials retained for example by means of a weir or the like. Alternatively filter means may be provided within the separation vessel to achieve the same purpose.

The recovery vessel may also include filter means or be adapted to decant liquor after the desired precipitation of calcium sulphate material has occurred. The recovery vessel may also be adapted to provided for at least one washing step for the precipitate of calcium sulphate.

The apparatus may also be equipped with recycle lines for returning recovered reagents to the process.

The invention will now be described further by way of examples with reference to experimental work.

MODES FOR PERFORMANCE OF THE INVENTION

Process Example 1

A mineral deposit containing gypsum is processed to provide comminuted particles which are introduced to a volume of water to which is added the chelating agent 4-(carboxymethyl)-2-(trimethylamino)pentane-1,5-dicarboxylic acid to form an extraction liquor. The whole is agitated to facilitate action of the chelating agent upon the comminuted particles. After a predetermined period of time in the range of a quarter of an hour to several hours insoluble material is separated from the extraction liquor, and the remaining liquor is treated with sufficient acidic material to lower the pH below 4. After precipitation of the target material has occurred the remaining liquor is separated therefrom for optional recycling or disposal. The target material is subjected to optional washing and drying steps for at sufficient number of cycles to obtain product of the desired purity and properties.

In variants of Process Example 1, the following chelating reagents are substituted in the process for the same purpose: 2-(carboxymethyl)-2-(trimethylamino)butane-1,4-dicarboxylic acid; 2-(carboxymethyl)-3-(trimethylamino) butane-1,4-dicarboxylic acid.

General Aspects of the Process

1. The recovery of calcium sulphate either as the hemihydrate, $CaSO_4 \cdot \frac{1}{2}H_2O$, or as the dihydrate, $CaSO_4.H_2O$), is enhanced by appropriate manipulation of the exact conditions of the recovery stage. Such means include, but are not limited to, (i) the addition of an appropriate type of seed-crystal to trigger the precipitation; (ii) and appropriate selection of the pH and the temperature; (iii) and optionally the addition of an appropriate water-miscible organic solvent or solvent mixture.

2. The process enables the recovery of any water-insoluble salt from a crude preparation of any origin.

3. The process also permits fractionation of a mixture of salts, of any origin, by appropriate manipulation of the exact conditions of the procedure outlined above. Such means potentially include, but are not limited to, selection of the chelating agent and the exact conditions of pH and temperature of the extraction stage, and at the recovery stage by (i) addition of an appropriate type of seed-crystal; (ii) by appropriate selection of the pH and temperature and (iii) by the addition of an appropriate water-miscible organic solvent or solvent mixture.

Typically, the crude material is mixed with an aqueous solution of a calcium-chelating agent at a specified pH and temperature. Calcium sulphate dissolves in this solution but other materials are insoluble and can be removed by a suitable mechanical process, such as filtration or centrifugation. Calcium sulphate is recovered from the solution by lowering the pH, through the addition of a suitable acid, to a point at which the chelating agent is inactivated and the calcium ion is released. Calcium sulphate then precipitates in virtually pure form. The solution of the chelating agent can be recycled for a further round of extraction following the addition of a suitable base to restore the original pH and reactivate the chelating agent.

A novel aspect of the invention lies in the use of a chemical, rather than purely physical extraction procedure and permits the recovery of calcium sulphate from a variety of sources in virtually pure form.

EXPERIMENTAL EXAMPLES

In order to demonstrate the application of this process for the recovery of pure calcium sulphate from samples of gypsum the following experiments were carried out. For these experiments EDTA was chosen as the chelating agent. The EDTA preparation used in these experiments was purchased as the tetrasodium salt (that is as $Na_4ETDA$) and was quoted by the manufacturer to contain >99% $Na_4EDTA$. This compound will be referred to simply as EDTA. At pH>4.5, one mol EDTA quantitatively binds one mol calcium ion.

The purity of the original gypsum preparations, and of the $CaSO_4$ recovered using this procedure, were determined using an industry-standard assay as follows. The sample is heated to a temperature of 290±10° C. in an ignition oven whereupon calcium sulphate (molecular weight 172.2) irreversibly decomposes to calcium oxide (molecular weight 55.1) plus gaseous sulphur oxides (sulphur dioxide, sulphur trioxide). The weight change, measured on cooling, is a measure of gypsum purity as defined by the equation, $$purity = \frac{loss\ in\ mass\ (grams)}{initial\ mass\ (grams)} \times 478$$

A sample of low-grade gypsum was obtained from a site owned by British Gypsum, Ltd., with permission. The material was first passed through a 2 mm square mesh screen to remove rock particles. The resulting sand-coloured powder assayed at 90% calcium sulphate using the ignition assay.

Experimental Work

Experiment 1:

Extraction stage: Thirty-nine grams (39 g) of this material, equivalent to 35 g, or 0.20 mol $CaSO_4$, was dissolved in 1000 ml water containing 100 g (0.27 mol) EDTA at pH 7.0 and stirred for 30 minutes. Separation stage: Insoluble material was removed by centrifugation (14800× g) for 10 minutes. A total of 3.8 g insoluble solids were recovered. The supernatant chelate solution was transparent and devoid of suspended solids. Recovery stage: The supernatant was acidified to pH 3.7 with sulphuric acid and 0.1 g $CaSO_4.2H_2O$ (99% wt by assay) was added to trigger precipitation. After 45 minutes the solution was centrifuged at 14800×g for 10 minutes to recover the precipitate. The precipitate was washed twice with 50 ml distilled water and dried overnight in an oven at 70° C. The resulting white powder assayed at 100% calcium sulphate by the ignition assay. Nineteen point seven grams (19.7 g; 0.11 mol) pure calcium sulphate was recovered, representing a yield of 51%. These data are summarised in Table 1.

Experiment 2:

In order to demonstrate that the aqueous chelating agent solution is recyclable the EDTA solution recovered at the end of Experiment 1 was titrated from pH 3.7 to pH 7.0 with sodium hydroxide solution and 15 g gypsum, equivalent to 13.5 g (0.078 mol) $CaSO_4$ was added. After 30 minutes the solution was centrifuged as before to remove insoluble material and $CaSO_4$ was recovered by titration to pH 3.7 with sulphuric acid. The precipitate was washed twice with 50 ml distilled water and dried overnight at 70° C. A pure white solid was recovered which assayed at 100% $CaSO_4$ by the ignition assay. 12 g (0.070 mol) of the solid was recovered, representing a yield of 80%.

Experiment 3:

The EDTA solution was recycled a second time. A further 15 g crude gypsum (equivalent to 0.078 mol $CaSO_4$) was dissolved in the EDTA solution recovered from Experiment 1 and 16.7 g $CaSO_4$ of 100% purity by ignition assay was recovered, representing a yield of 111%.

These results show that $CaSO_4$ can be purified from a gypsum sample by this method.

The low and variable yield of $CaSO_4$ was a consequence of the limitations imposed by the use of EDTA as the chelating agent in these experiments. Specifically, EDTA is insoluble in water at low pH. Therefore in lowering the pH of the EDTA-calcium sulphate solution two processes were triggered: the desirable process of releasing the calcium ion, hence causing the precipitation of $CaSO_4$, and the undesirable process of precipitating EDTA. In order to recover $CaSO_4$ in a form which was substantially free from EDTA, therefore, it was necessary to determine the lowest pH at which EDTA remained in aqueous solution, in an independent experiment. This pH was determined to be pH 3.7, approximately, for a solution containing 100 g (0.27 mol) EDTA, per 1000 ml water, as used in Experiment 1. It was also found that, at pH 7, up to 0.26 mol $CaSO_4$ could be dissolved in this solution, consistent with the expected capacity based on the ability of EDTA to combine with calcium ion in 1:1 molar ratio. When the pH of this solution was lowered to pH 3.7, only about one-half of the $CaSO_4$ (0.13 mol) was recovered. This observation was consistent with the result of Experiment 1, in which 0.11 mol $CaSO_4$ was recovered from a gypsum sample containing 0.2 mol $CaSO_4$. The $CaSO_4$ remaining in solution could not be recovered in pure form, since this required the pH to be lowered beyond pH 3.7, which would also result in EDTA precipitation.

In principle, this solution can be recycled, albeit with a total CaSO$_4$-dissolving capacity of only one-half of that of the original solution, or approximately 0.13 mol per 1000 ml solution. In order to test this hypothesis, Experiment 2 was carried out. In this experiment, a quantity of gypsum equivalent to 0.078 mol CaSO$_4$ (corresponding to 60% of the estimated capacity of 0.13 mol per 1000 ml) was added at the extraction stage. At the recovery stage (acidification to pH 3.7), 0.07 mol CaSO$_4$ was recovered, equivalent to a yield of 80%. In a second recycle of the same solution (Experiment 3), the yield of CaSO$_4$ from the same amount of gypsum was 110%. This high yield was attributed to the precipitation of CaSO$_4$ introduced into solution in the earlier cycles; the calcium-binding capacity of EDTA was found to be quite pH-sensitive in the vicinity of pH 3.7, and a marginal fall below pH 3.7 could easily result in the release of fractionally more CaSO$_4$.

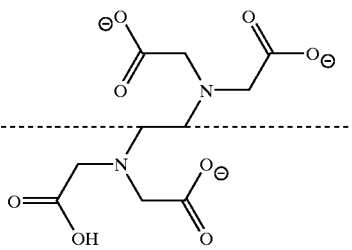

FIG. 1: The structure of ethane 1,2-diamine N,N,N'N' tetra-acetic acid (EDTA). The dashed line shows the axis of two-fold rotational symmetry.

EDTA is a symmetrical molecule (FIG. 1). The functional groups are four carboxylic groups, arranged in two pairs. In the range pH 6–10, three of these are ionised (carboxylate)

TABLE 1

Recovery of CaSO$_4$ from a crude gypsum preparation using an aqueous EDTA solution as a solvent

| Experiment no | crude gypsum | solids recovered at neutral pH | CaSO$_4$ recovered at pH 3.7 | estimated gypsum remaining in solution | yield (%) |
|---|---|---|---|---|---|
| 1 | 39 | 3.9 | 20 | 15 | 51 |
| 2 | 15 | 1.6 | 12.0 | 17 | 80 |
| 3 | 15 | 2.5 | 16.7 | 15.1 | 111 |

All masses are given in grams.
The crude gypsum preparation assayed at 90% wt by ignition assay after passing through a 2 mm square mesh screen.

It was concluded from Experiments 2 and 3 that the EDTA solution could be recycled indefinitely, albeit with lower than expected capacity for CaSO$_4$.

The low yield of CaSO$_4$ from Experiment 1, and the low capacity of the recovery solution for CaSO$_4$ in subsequent rounds of extraction, were a direct consequence of the insolubility of EDTA in acidic solution at the pH values required to release all of the CaSO$_4$. These examples therefore serve both to illustrate the potential use of chelating agents for large scale recovery of CaSO$_4$ and also to identify the primary factors which limit the specific application of EDTA, and other commercially available chelating agents, for this application.

The experimental work indicates that the ideal chelating agent for this purpose, therefore, will have the following properties:
1. It will be extremely water-soluble over a wide range of pH, encompassing the values the extraction, separation and recovery stages. Most importantly, the chelating agent must remain in solution at the low pH of the recovery stage, in order to prevent the recovered CaSO$_4$ from becoming significantly contaminated with precipitated chelating agent.
2. It will be capable of efficiently chelating the calcium ion to the extent that chelation should be essentially irreversible at the pH of the extraction stage.
3. The chelating agent should be incapable of chelating the calcium ion at a lower pH, so permitting dissolved CaSO$_4$ to be recovered by the simple means of acidifying the solution.

In order to understand why the solubility of EDTA is relatively low at low pH, and hence to rationally design new chelating agents with the requisite solubility properties, it is necessary to understand the relationship between the structure and function of EDTA.

groups, as shown in FIG. 1. This is the form of EDTA present in the extraction step of the above experiments. The three ionised groups together are responsible for chelating the calcium ion. Since the calcium ion carries a net positive charge of +2 and the EDTA molecule has a net charge of −3, the Ca-EDTA complex has a net charge of −1, and is therefore highly water soluble.

In order to release the calcium ion, the pH must be lowered to between pH 3 and pH 4, so that the three carboxylates responsible for chelating the calcium ion become protonated. However, in this pH range EDTA then has no net charge and is hence relatively insoluble in water. Therefore, EDTA and CaSO$_4$ both precipitate out of acidic solutions, and thus cannot be separated.

In order to eliminate this problem a new kind of chelating agent is required, which is designed to remain charged, and hence retain water-solubility, at low pH.

The chelating agents shown on the following page are examples of novel compounds which are expected to possess both calcium-chelating properties and maintain high water-solubility across a wide pH-range.

Such compounds contain three carboxylic acid groups, arranged as in the EDTA molecule, to strongly chelate a divalent metal ion such as Ca$^{2+}$. These molecules also contain a quaternary amine group. By these means a positive charge is introduced into the molecule; furthermore, this group is not pH-titratable and will remain positively charged over the entire pH range. Therefore both the ion complex of such a compound with the calcium ion and the low-pH form of the compounds (all three carboxyl groups protonated) will bear a net positive charge, and hence retain water-solubility.

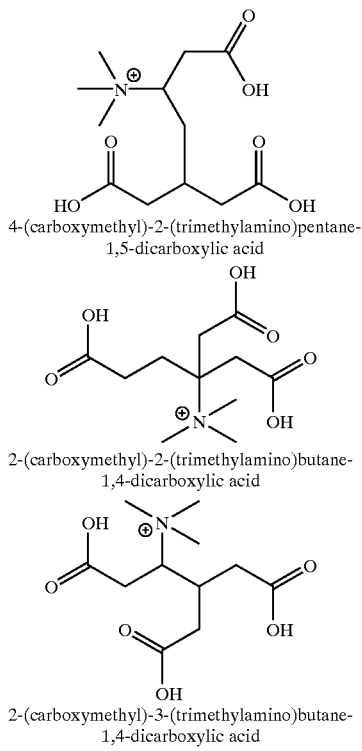

4-(carboxymethyl)-2-(trimethylamino)pentane-1,5-dicarboxylic acid 2-(carboxymethyl)-2-(trimethylamino)butane-1,4-dicarboxylic acid 2-(carboxymethyl)-3-(trimethylamino)butane-1,4-dicarboxylic acid The compounds shown are intended only for illustrative purposes as examples to show the type of compounds which satisfy the basic requirement, viz the ability to chelate calcium ion combined with high solubility at low pH, can be realised. It is not intended that the invention should be specifically limited to use in conjunction with only any one of the illustrated compounds and those skilled in the art, given this teaching will be able to identify and if necessary synthesise equivalent chelating compounds that can be used in the process.

Industrial Application of the Invention

The invention permits the selective recovery of calcium sulphate from a crude source material. The basis of the selectivity resides in the use of a chemical, rather than of a conventional physical separation technique. Therefore, the invention has utility in the fields of mineral extraction of gypsum, recycling of calcium sulphate-based or gypsum containing materials, purification processes involving extraction of calcium sulphate, and effectively enables removal of radioactive species from calcium sulphate deposits and formations, and generally offers an alternative in waste management to disposal of calcium sulphate-based materials in landfill sites.

What is claimed is:

1. A method of purifying calcium sulfate ($CaSO_4$), particularly enabling $CaSO_4$ to be separated from other materials, said method comprising the steps:

(a) providing a low-grade source of calcium sulfate to be purified;

(b) contacting the low-grade source of calcium sulfate with an aqueous medium at neutral or alkaline pH, and an acid-soluble chemical chelating reagent suitable for chelating calcium, thereby forming an aqueous chelate solution; and (c) recovering purified calcium sulfate by lowering the pH of said chelate solution to less than 4.0 with a mineral acid, whereby calcium sulfate is selectively precipitated from said solution.

2. A method according to claim 1, further comprising the step of separating the aqueous chelate solution from any insoluble material by a mechanical treatment.

3. A method according to claim 2, wherein said mechanical treatment comprises centrifugation.

4. A method according to claim 2, wherein said mechanical treatment comprises filtration.

5. A method according to claim 2, wherein the separated aqueous chelate solution is titrated back to a pH above about pH 4 and recycled for use in a further round of $CaSO_4$ extraction.

6. A method according to claim 1, wherein the calcium chelating agents are polydentate molecules that are modified, by addition or substitution, with a solubilizing functional group to improve water solubility thereof.

7. A method according to claim 6, wherein the solubilizing group enables the chelating agent to remain soluble below pH 4.

8. A method according to claim 6, wherein the solubilizing functional group is a quaternary ammonium group.

9. A method according to claim 1, wherein the chelating agents are selected from the group consisting of 4-(carboxymethyl)-2-(trimethylamino)pentane-1,5-dicarboxylic acid; 2-(carboxymethyl)-2-(trimethylamino) butane-1,4-dicarboxylic acid; 2-(carboxymethyl)-3-(trimethylamino)-butane-1,4-dicarboxylic acid; and sodium salts of any one of the aforesaid dicarboxylic acids.

10. A method according to claim 1, wherein the chelating agent chelating functionality is selected from the group consisting of sulfonic acid and carboxylic acid functionalities.

* * * * *